(12) United States Patent
Lotters et al.

(10) Patent No.: US 10,627,277 B2
(45) Date of Patent: Apr. 21, 2020

(54) CORIOLIS FLOW SENSOR HAVING TWO DETECTION ELEMENTS PARTLY OVERLAPPING THE EXCITATION AXIS AND ARRANGED ON OPPOSITE SIDES OF THE FLOW TUBE

(71) Applicant: Berkin B.V., Ruurlo (NL)

(72) Inventors: Joost Conrad Lotters, Ruurlo (NL); Jarno Groenesteijn, Ruurlo (NL); Remco Gerardus Petrus Sanders, Ruurlo (NL); Remco John Wiegerink, Ruurlo (NL)

(73) Assignee: BERKIN B.V., Ruurlo (NL)

( * ) Notice: Subject to any disclaimer, the term of this patent is extended or adjusted under 35 U.S.C. 154(b) by 10 days.

(21) Appl. No.: 16/069,789

(22) PCT Filed: Jan. 13, 2017

(86) PCT No.: PCT/NL2017/050014
§ 371 (c)(1),
(2) Date: Jul. 12, 2018

(87) PCT Pub. No.: WO2017/123089
PCT Pub. Date: Jul. 20, 2017

(65) Prior Publication Data
US 2019/0056254 A1 Feb. 21, 2019

(30) Foreign Application Priority Data
Jan. 14, 2016 (NL) ...................................... 2016092

(51) Int. Cl.
*G01F 1/84* (2006.01)

(52) U.S. Cl.
CPC ............ *G01F 1/8445* (2013.01); *G01F 1/849* (2013.01); *G01F 1/8427* (2013.01)

(58) Field of Classification Search
None
See application file for complete search history.

(56) References Cited

U.S. PATENT DOCUMENTS

| 4,823,614 A | * | 4/1989 | Dahlin ................. G01F 1/8409 73/198 |
| 6,170,339 B1 | * | 1/2001 | van der Pol .......... G01F 1/8409 73/861.357 |

(Continued)

FOREIGN PATENT DOCUMENTS

| EP | 1719982 | 11/2006 |
| EP | 2078936 | 7/2009 |
| JP | 2003-247878 | 9/2003 |

OTHER PUBLICATIONS

Alveringh et al., A Novel Capacitive Detection Principle for Coriolis Mass Flow Sensors Enabling Range/Sensitivity Tuning. The 41$^{st}$ International Conference on Micro- and Nano-Engineering. Sep. 1, 2015. 2 pages.

(Continued)

*Primary Examiner* — Harshad R Patel
(74) *Attorney, Agent, or Firm* — Casimir Jones, S.C.

(57) ABSTRACT

The invention relates to a Coriolis flow sensor, comprising at least a Coriolis-tube, wherein the flow sensor comprises an excitation element for causing the tube to oscillate, as well as a detection element for detecting at least a measure of displacements of parts of the tube during operation. In some embodiments, the detection element comprises two detection elements that are positioned on both sides of the Coriolis tube, wherein the detection elements partly overlap each other.

4 Claims, 3 Drawing Sheets

(56) References Cited

U.S. PATENT DOCUMENTS

Figure 1A:
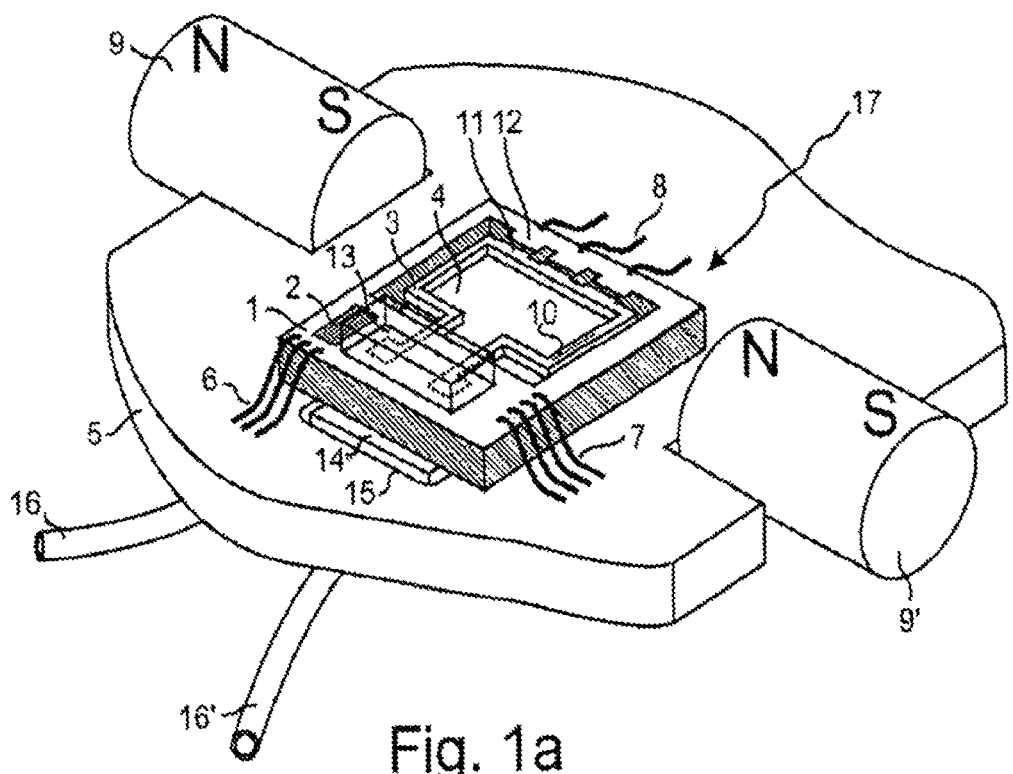

| | | | | |
|---|---|---|---|---|
| 6,477,901 B1* | 11/2002 | Tadigadapa | ........... | G01F 1/8404 |
| | | | | 73/861.352 |
| 6,748,813 B1* | 6/2004 | Barger | ................. | G01F 1/8409 |
| | | | | 73/861.354 |
| 7,690,269 B2* | 4/2010 | Simonsen | ............. | G01F 1/8409 |
| | | | | 73/861.357 |
| 2002/0020228 A1* | 2/2002 | Ohnishi | ................ | G01F 1/8418 |
| | | | | 73/861.357 |
| 2006/0243067 A1* | 11/2006 | Mehendale | ........... | G01F 1/8409 |
| | | | | 73/861.355 |
| 2009/0308177 A1* | 12/2009 | Lammerink | .......... | G01F 1/6845 |
| | | | | 73/861.355 |
| 2011/0197650 A1* | 8/2011 | Young | ................... | B29C 67/004 |
| | | | | 73/1.16 |
| 2012/0137788 A1* | 6/2012 | Haefliger | ................ | F16L 55/04 |
| | | | | 73/861.357 |
| 2016/0349091 A1* | 12/2016 | Huber | .................... | G01N 9/002 |

OTHER PUBLICATIONS

Lotters et al., Integrated Thermal and Microcoriolis Flow Sensing System with a Dynamic Flow Range of More than Five Decades. Micromachines. 2012;3(4):194-203.

Wiegerink et al., Fully Integrated Micro Coriolis Mass Flow Sensor Opering at Atmospheric Pressure. IEEE 24$^{th}$ International Conference on Micro Electro Mechanical Systems (MEMS). Jan. 23, 2011. pp. 1135-1138.

International Search Report and Written Opinion for PCT/NL2017/050014, dated Apr. 10, 2017, 10 pages.

* cited by examiner

CORIOLIS FLOW SENSOR HAVING TWO DETECTION ELEMENTS PARTLY OVERLAPPING THE EXCITATION AXIS AND ARRANGED ON OPPOSITE SIDES OF THE FLOW TUBE

The invention relates to a Coriolis flow sensor, comprising at least a Coriolis-tube, excitation means for causing the tube to oscillate, as well as detection means for detecting at least a measure of displacements of parts of the tube during operation.

A Coriolis flow sensor having a loop-shaped Coriolis tube is known from EP 1 719 982 A1. Various types of loop-shaped Coriolis tubes are described therein, both of the single loop type and of the (continuous) double loop type. The present invention relates to any of these types, but is not restricted thereto.

A Coriolis flow sensor (also indicated as flow sensor of the Coriolis type) comprises at least one vibrating tube, often denoted Coriolis tube, flow tube, or sensing tube. This tube or these tubes is or are fastened at both ends to the housing of the instrument. These tube ends serve at the same time as feed and discharge ducts for the liquid or gas flow to be measured.

Besides the flow tube (or tubes), a Coriolis flow sensor comprises two further subsystems, i.e. one for excitation and one for detection. The excitation system (exciter) is arranged for bringing the tube into vibration. For this purpose, one or several forces or torques are applied to portions of the tube. The detection system is arranged for detecting at least a measure of the displacements of one or several points of the tube as a function of time.

As a fluid flows in the vibrating tube, it induces Coriolis forces, proportional to the mass-flow, which affect the tube motion and change the mode shape. Measuring the tube displacement using the detection system, the change of the mode shape may be measured, which allows for mass-flow measurements.

The vibration of the tube generated by the exciter takes place at a more or less fixed frequency which varies slightly as a function, amongst others, of the density of the medium flowing through the tube. The vibration frequency is almost always a natural frequency of the tube so that a maximum amplitude can be achieved with a minimum energy input.

When measuring large fluid flows, a Coriolis mass flow sensor is generally the preferred sensor due to its medium independent mass flow measurement. While conventional Coriolis flow sensors are widely used, there are no commercially available micromachined Coriolis flow sensors. The most accurate known micro Coriolis mass flow sensor is capable of measuring from 0.55 $\mu g\ s^{-1}$ up to 277 $\mu g\ s^{-1}$. Instead, thermal flow sensors are used for very low flows, but these kinds of sensors depend on fluid properties and need calibration for each fluid. Using a Coriolis flow sensor for these flows as well would eliminate the need for calibration for each fluid and allows measurement of unknown fluids, e.g. reaction products.

It is an object of the present invention to provide an improved Coriolis flow sensor, in particular a Coriolis flow sensor designed to be sensitive to low flows.

To this end, the invention provides a Coriolis flow sensor comprising a Coriolis tube, excitation means as well as detection means.

The Coriolis tube comprises a measuring tube part that extends transversely with respect to the excitation axis. The excitation axis may lie in a plane defined by the Coriolis tube. The excitation axis may substantially coincide with a symmetry axis of the Coriolis tube. The excitation means are designed to exert a twisting oscillation of the Coriolis tube about the excitation axis. As a result, the Coriolis displacement is due to an oscillation about an oscillation axis that extends substantially transverse to the excitation axis and lies in the plane defined by the Coriolis tube.

The detection means comprise two detection elements that are positioned on opposite sides of the measuring tube part, partly overlapping the excitation axis. In this way, the detection elements are positioned closer to the excitation axis, such that the measured excitation oscillation is reduced. The measured actuation amplitude has been reduced by reducing the distance between the read-out structures, i.e. the detection elements, and the distance can be reduced further by changing the location of the read-out structures, i.e. placing the detection elements on opposite sides of the Coriolis-tube. By placing the read-out structures, e.g. combs, on opposite sides of the flow tube they can partly overlap and the center of each detection element, e.g. comb, can be placed closer to the excitation or twist axis. This way, the sensitivity of the Coriolis flow sensor is increased as the measured displacement is to a larger extent the result of the Coriolis displacement.

The detection elements are provided such that they partly overlap the excitation axis. This allows the detection elements to be positioned closer to the center of the twist axis, resulting in a reduced sensitivity to excitation oscillations, whilst maintaining the same sensitivity to Coriolis displacements.

The detection elements are provided behind each other, partly overlapping, as seen in a direction parallel to the excitation axis, and provided on opposite sides of the measuring tube part. The detection elements are substantially positioned in the plane defined by the Coriolis tube, on opposite sides of the measuring tube part.

According to the invention, at least one of the two detection elements is positioned asymmetrical with respect to the excitation axis. The center of the read out structure, e.g. the comb, is placed at a distance from the excitation or twist axis. The distance between the twist axis and the center of the comb structures can also be decreased further, however, this also increases the influence of effects that might change the exact location of the twist axis (e.g. imperfections in the fabrication process), which is undesirable.

With the invention, a Coriolis flow sensor was designed, fabricated and tested which can measure up to 50 $\mu g\ s-1$ at a maximum pressure drop of 1 bar with a zero stability of 14 ng s-1, an improvement by a factor 40 compared to Coriolis flow sensors according to the prior art.

In an embodiment, the Coriolis tube is substantially loop shaped, such as rectangular loop shaped. Other loop shapes, such as triangular, trapezoidal, or U-shaped, are also possible In an embodiment, each of the two detection elements is positioned asymmetrical with respect to the excitation axis. One of the two detection elements may in an embodiment be positioned further to one side of the excitation axis, and the other one of the two detection elements may be positioned further to the other side of the excitation axis. This way the excitation oscillation measured is relatively small compared to the capacitance value due to Coriolis displacement; and furthermore it is possible to filter out to a certain degree these excitation oscillations due to the mirrored positioning of the detection elements.

In an embodiment, the detection elements are read out electrodes. These are in particular very suitable for micromachined Coriolis flow sensors.

In an example, the distance of the detection elements, e.g. combs, to the twist axis is reduced from 550 μm (prior art) to only 125 μm (according to the invention), resulting in a reduced sensitivity to the actuation mode by a factor 550/125=4.4. Additionally, the measured Coriolis amplitude may be increased in an embodiment by decreasing the diameter of the Coriolis tube. By changing the diameter of the channel from 40 μm to 31 μm, for example, an increase in the Coriolis amplitude by a factor of $(40/31)^3=2.1$ is obtained. This implies that in total the sensitivity may be increased by a factor of 9.2.

The electrical noise level of the detection elements, i.e. read-out elements in the form of combs, may also be reduced by increasing the capacitance of the read-out structures. To do this the gap between the comb-fingers of the opposing electrodes is reduced.

Figure 1B:
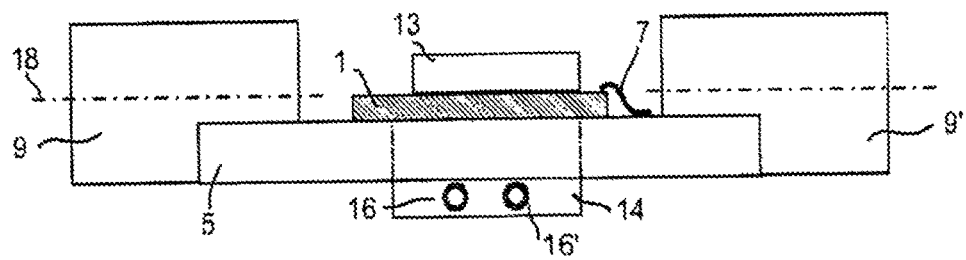
Figure 1C:
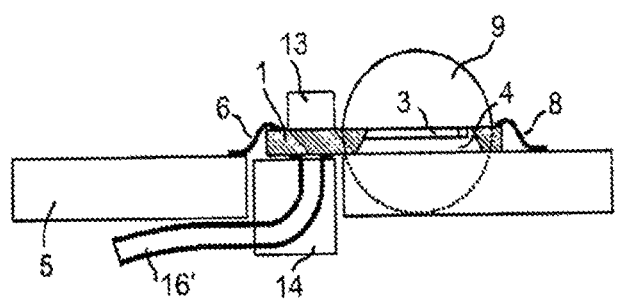
Figure 2A:
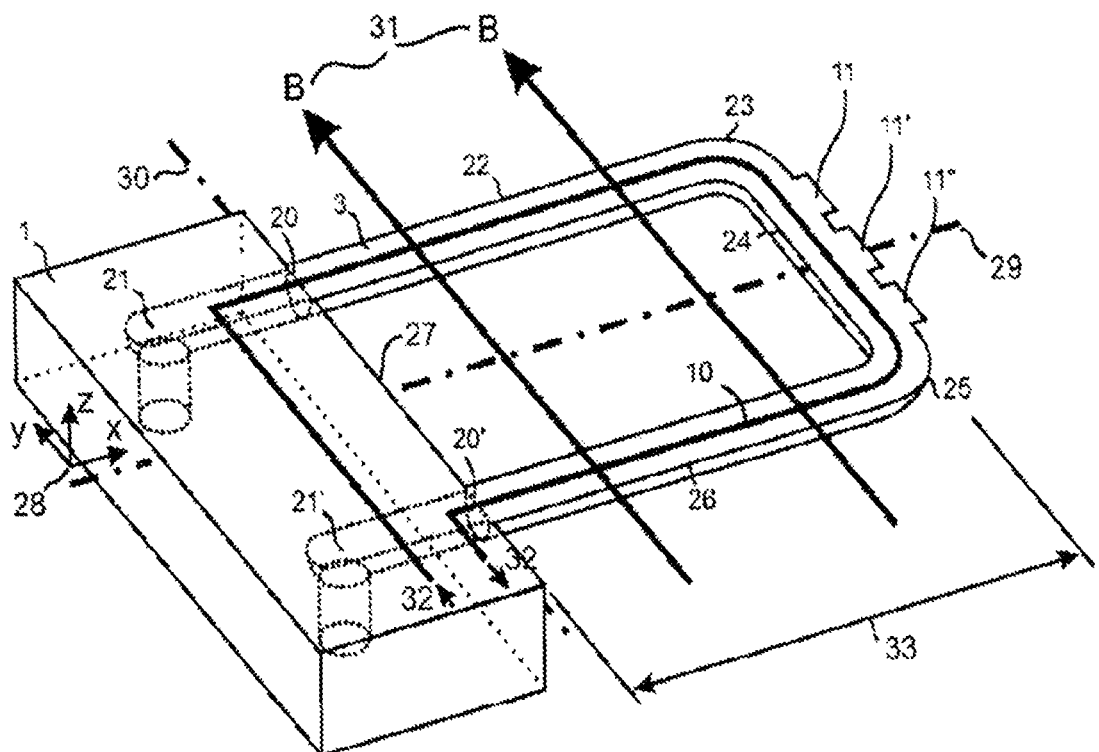
Figure 2B:
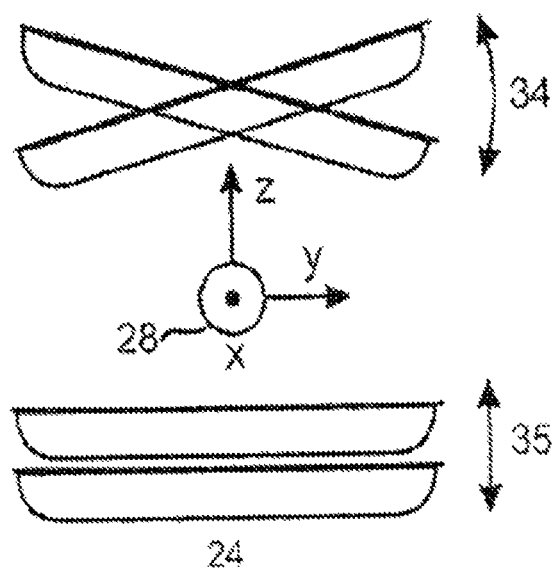
Figure 3:
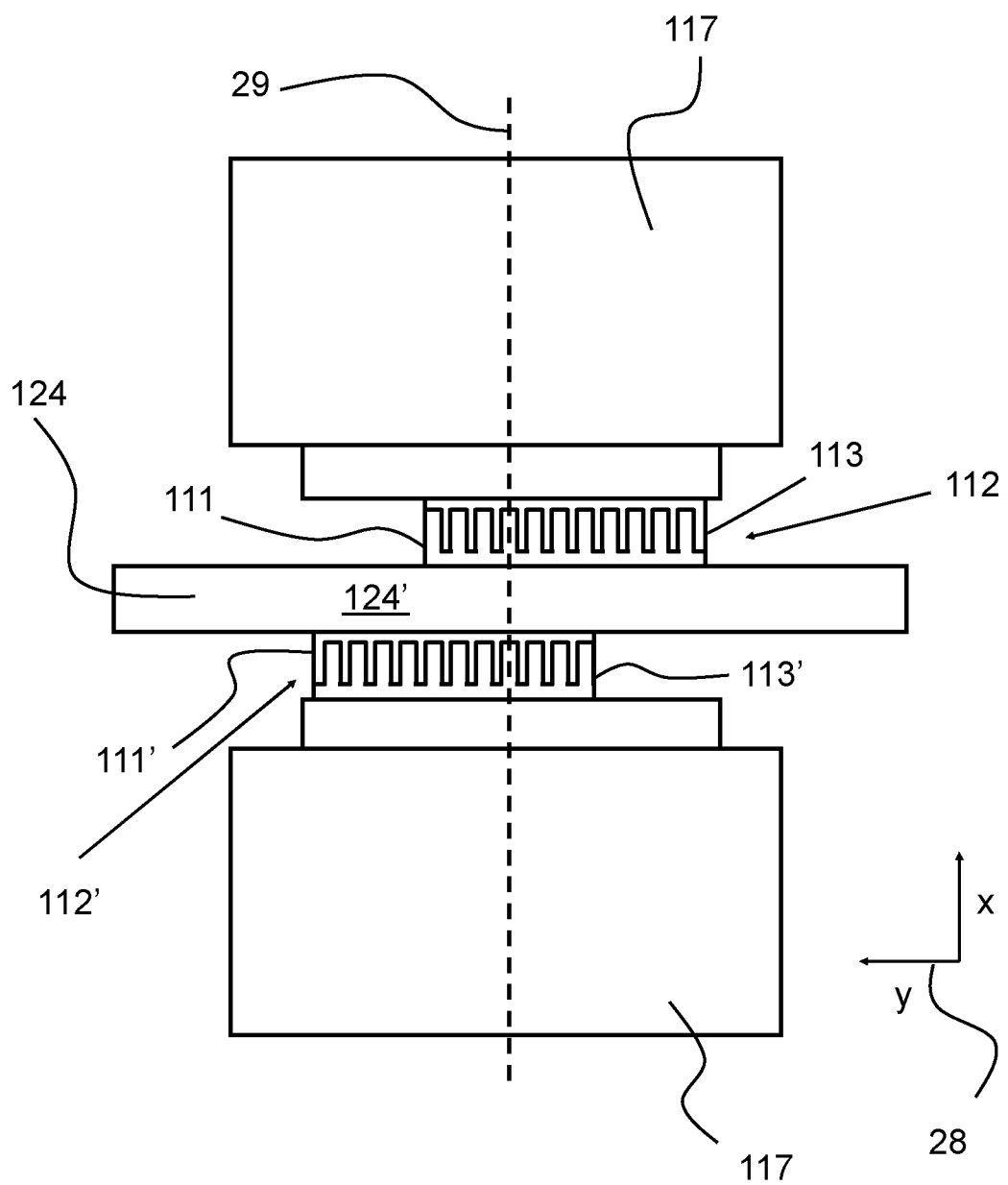

The invention will be explained in more detail below, by way of example, with reference to the drawing in which:

FIG. 1a: is a diagrammatic elevation of an embodiment of a prior art flowmeter with a system chip and a Coriolis flow sensor;

FIG. 1b: is a front elevation of the flowmeter of FIG. 1a;

FIG. 1c: is a cross-sectional view of the flowmeter of FIG. 1a;

FIG. 2a: presents a clarification of the operation of a Coriolis flow sensor in an arrangement with a U-shaped Coriolis tube (with a diagrammatically indicated actuation and sensing of the vibrating Coriolis tube);

FIG. 2b: shows a Lorentz actuation (torsion) and capacitive sensing (flapping) of the tube;

FIG. 3: shows an embodiment of the read-out elements of the Coriolis flow sensor according to the invention;

Corresponding components have been given the same reference numerals as much as possible in the Figures.

FIGS. 1 and 2 are descriptions of a prior art flow meter of the Coriolis type as described in EP2078936 B1, to which the invention may be applied. The reference to these figures is used to clarify the general build of these types of flowmeters, and the method of operation.

FIG. 1a shows a system chip 17 comprising a monocrystalline silicon substrate 1 in which an opening 4 has been etched. The system chip 17 in this example has a Coriolis flow sensor with a Coriolis tube 3 of silicon nitride which is freely suspended in the opening 4 as two outer ends of the tube 3 are fixedly connected to the substrate 1. An absolute pressure sensor 2, such as a Pirani pressure sensor, may be integrated in or on the substrate 1. The Coriolis tube has a loop shape, in this case a rectangular loop shape. Other loop shapes, such as triangular, trapezoidal, or U-shaped, are also possible.

The system chip 17 is (monolithically) assembled with two mutually opposed permanent magnets 9, 9' which are arranged on a carrier 5, for example a PCB (printed circuit board) of ceramic or synthetic resin material with copper tracks thereon. The substrate is manufactured from a <1,0,0> Si wafer mounted on the carrier 5. The electrical connections between the system chip 17 and the carrier 5 are provided by so-termed bonding wires arranged in groups 6, 7, and 8. The bonding wires 6 (from and to the sensor chip) serve for conditioning the chip temperature/c.q. temperature control. A local temperature sensor and an (ambient) pressure sensor 2 may be present, if so desired.

The pressure sensor 2, if present, measures the absolute pressure. This is important because the quality factor of the tube's vibration depends inter alia on the air pressure.

The bonding wires 7 serve for bringing the freely suspended tube 3 into vibration. The bonding wires 8 serve for controlling the read-out elements for the freely suspended tube.

The freely suspended tube 3 together with the rod magnets 9, 9', a current conductor (wire) 10 on the tube 3, and capacitive sensor elements 11 on the tube and 12 on the system chip 17 forms a so-termed Coriolis flowmeter, which is further clarified in FIGS. 2a to 2b. A body of soft magnetic material may optionally be provided between the rod magnets 9 and 9' in a location within the loop so as to enhance the efficiency of the magnet arrangement.

The hydraulic coupling of the system chip 17 to the external world is provided by pressure blocks 13 and 14 (FIG. 1b). Fluid connections 16 and 16' are present in the pressure block 14. The application of a pressure force between the pressure block 13, the substrate 1, and the pressure block 14 provides a gastight closure of the fluid connection between the tubes 15, 15' and the substrate 1.

FIG. 1b shows the same device as FIG. 1a, but viewed from the front. The 'upper side' of the system chip 17 lies on the centerline 18 of the rod magnets 9 and 9'.

FIG. 1c shows the same device as FIG. 1a, this time taken on a cross-section at the area of the system chip. Bonding wires 6, 7 for the tube actuation control on the PCB from/to the sensor chip are visible, as are bonding wires 8 for the tube sensing control on the PCB from/to the sensor chip. The bonding wires 6, 7 and 8 thus serve the integrated sensors/transducers of the Coriolis sensor.

A housing may be provided around the entire assembly for protection; this is not shown.

FIG. 2a shows a U-shaped Coriolis tube 3 that was made by MST technology. The Coriolis tube 3 is freely suspended, and is partly embedded in the silicon substrate where it merges into inlet and outlet channels present in the substrate and issuing at the side of the substrate 1 opposite to the freely suspended portion 3. The substrate 1 thus forms tube fixation means that fix outer ends 20, 20' of the Coriolis tube 3. The applied magnetic field 31 is indicated by arrows B, and the current passed through the conductor 10 on the tube 3 for generating the Lorentz forces is referenced 32.

During operation, a medium enters at 21 and exits at 21'. The mass flow of a medium is the mass that passes through a cross-section of the tube per second. If the mass is a self-contained quantity, the mass flow through the U-tube of FIG. 2a must be the same everywhere (otherwise mass will accumulate somewhere, or mass disappear somewhere).

Therefore, the mass flow Q has the same (constant) modulus (or vector 'length') everywhere in the tube 3. However, Q points in the positive x-direction in tube portion 22 and in the negative x-direction in tube portion 26.

The following method shown in FIG. 2b exists for realizing and applying a Coriolis mass flowmeter with the U-tube 3 of FIG. 2a. The U-tube is actuated (vibrated) about an axis of rotation 29 (=the x-axis), which in the case of a mass flow leads to a Coriolis force in that location where the distance to the axis of rotation changes, which is at tube portion 24. This Coriolis force on tube portion 24 causes the U-tube 3 to rotate about an axis of rotation 30 (=the y-axis), leading to a translatory movement of the tube portion 24. This (vibratory) actuation movement is referenced 34 in FIG. 2b. The resulting Coriolis-induced rotation about the y-axis is proportional to the mass flow and results in a z-movement 35 of the tube portion 24. The tube portion 24 performs both movements simultaneously, i.e. the actuating torsional vibration 34 and the flapping movement 35 (proportional to the mass flow).

FIG. 3 shows a top view of a detail of the tube portion 124 in a Coriolis flow sensor according to the invention, which is modified in that the detection means (112, 112') comprise two detection elements (112, 112') that are positioned on opposite sides of the Coriolis tube (124), wherein the detection elements partly overlap each other. FIG. 3 shows the excitation axis 29, which lies in the x, y, plane (see coordinate system 28), mainly parallel to the x-axis. The Coriolis tube shows a measurement tube part 124' that extends transversely to the excitation axis 29, and that lies substantially in the x,y plane. On opposite sides of the measurement tube part 124', i.e. in the positive and negative x-direction, base structures 117 are located to which the detection elements 112, 112' are associated. In particular, the base structure may be part of the system chip 117. The detection elements each comprise capacitive read-out structures each defined by two comb like structures 111, 113, of which one 111, 111' is connected to the measurement tube part 124, and another one 113, 113' is connected to the base part 117. These capacitive read-out structures are known to those skilled in the art, as described for example in EP2078936B1 with respect to FIGS. 6a and 6b.

The detection elements 112, 112' extend substantially parallel to the measurement tube part 124, and thus extend in the plane defined by the Coriolis tube (x,y plane), mainly in y-direction. It can be seen that the detection elements 112, 112' are provided with an offset with respect to each other, in a direction mainly parallel to the measuring tube part 124 (i.e. the y-direction). The detection elements 112, 112' are both positioned asymmetrical with respect to the excitation axis 29. In the embodiment shown, one of the detection elements 112 is provided more to the right, and the other one of the detection elements 112' is provided more to the left.

With this positioning, the detection elements 112, 112' are positioned closer to the twist axis 29, such that the sensitivity to the excitation displacement (see top of FIG. 2b) is reduced. Advantages of such a positioning have already been described above.

An example of a fabrication process suitable for producing a micromachined Coriolis flow sensor is described EP2078936 B1 in particular with respect to FIGS. 4a to 4j, and FIG. 5.

An alternative fabrication process may be as follows.

First, a 500 nm thick layer of LPCVD silicon-rich nitride (SiRN) is deposited on a 525 μm thick silicon wafer. Rectangular etch slits 5 μm long and 1.2 μm wide are etched in the SiRN layer to define the outline of the channels and the channels are etched using a semi-isotropic SF6 plasma etch.

A thick layer of LPCVD tetraethyl orthosilicate (TEOS) is deposited to protect the channels during backside processing. The inlets and outlets of the sensor are then etched from the backside using the Bosch process.

The TEOS layer is removed and a thick (1.5 μm) layer of LPCVD SiRN is deposited to form the channel wall and seal the etch slits. A 10/200 nm thick layer of chromium and gold is sputtered on top of the wafers and patterned to form the tracks and electrodes for actuation and read-out of the chip. The last step consists of an isotropic SF6 plasma etch step to remove the silicon around part of the channel, resulting in a free-hanging channel that can vibrate.

The invention claimed is:

1. Coriolis flow sensor, comprising:
   a Coriolis tube (3);
   excitation element (9, 9', 10) for oscillating said tube about an excitation axis (29), wherein the Coriolis tube comprises a measuring tube part (124, 124') that extends transversely with respect to the excitation axis (29); as well as
   detection element (112, 112') for detecting, in use, at least a measure for movements of part of the Coriolis tube (3), wherein the detection element comprises two detection elements (112, 112') that are positioned on opposite sides of the measuring tube part (124), partly overlapping the excitation axis (29), wherein the detection elements (112, 112'), as seen in a direction parallel to the excitation axis (29), are provided behind each other and partly overlapping each other, and wherein at least one of the two detection elements (112, 112') is positioned asymmetrical with respect to the excitation axis (29).

2. Coriolis flow sensor according to claim 1, wherein the Coriolis tube (3) is substantially U-shaped.

3. Coriolis flow sensor according to claim 1, wherein each of the two detection elements (112, 112') is positioned asymmetrical with respect to the excitation axis (29).

4. Coriolis flow sensor according to claim 1, wherein the detection elements are read out electrodes (111, 113; 111', 113').

* * * * *